United States Patent [19]

Ishida

[11] Patent Number: 4,784,097
[45] Date of Patent: Nov. 15, 1988

[54] COMBUSTION CHAMBER FOR INTERNAL COMBUSTION ENGINE

[75] Inventor: Shiro Ishida, Fujisawa, Japan

[73] Assignee: Isuzu Motors Limited, Tokyo, Japan

[21] Appl. No.: 939,988

[22] Filed: Dec. 10, 1986

[30] Foreign Application Priority Data

Dec. 10, 1985 [JP] Japan .................. 60-276025

[51] Int. Cl.$^4$ .................................. F02B 19/08
[52] U.S. Cl. ......................... 123/260; 123/262; 123/276
[58] Field of Search ............... 123/256, 262, 263, 260, 123/276, 279, 301, 305, 275, 288

[56] References Cited

U.S. PATENT DOCUMENTS

| | | | |
|---|---|---|---|
| 3,144,008 | 8/1964 | List | 123/276 X |
| 3,255,739 | 6/1966 | Von Seggern et al. | 123/288 X |
| 3,504,681 | 4/1970 | Winkler | 123/276 X |
| 3,580,230 | 5/1971 | Hoffmann et al. | 123/276 X |
| 3,916,864 | 11/1975 | Horstmann | 123/276 |

Primary Examiner—Tony M. Argenbright
Attorney, Agent, or Firm—Cullen, Sloman, Cantor, Grauer, Scott & Rutherford

[57] ABSTRACT

Disclosed herein is a combustion chamber for internal combustion engines using a volatile fuel of low certain number such as gasoline, alcohol or the like. The fuel is directly injected into communicating main and subsidiary combustion chambers which are formed side by side in the top wall of a piston and in which swirls are formed. The fuel is supplied into the main and subsidiary combustion chambers in atomized form to facilitate its volatilization, and partly deposited in the form a film which is easily volatilized by hot compressed air and wall heat in the respective combustion chambers. A spark plug is provided in the main and subsidiary combustion chambers to accelerate ignition of the atomized fuel supplied thereto.

13 Claims, 2 Drawing Sheets

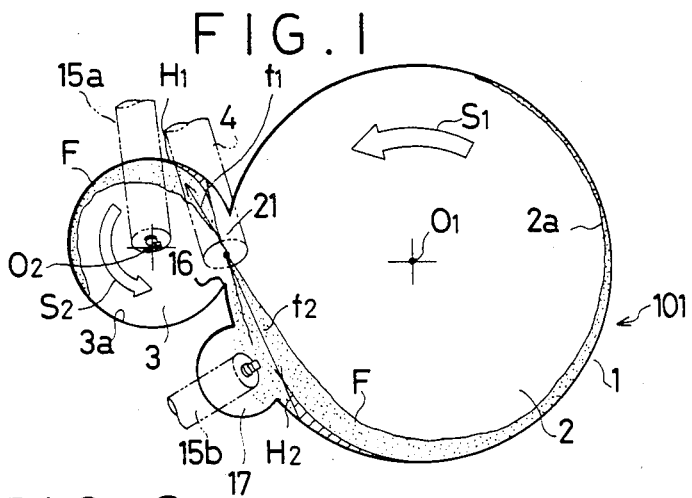
FIG. 1
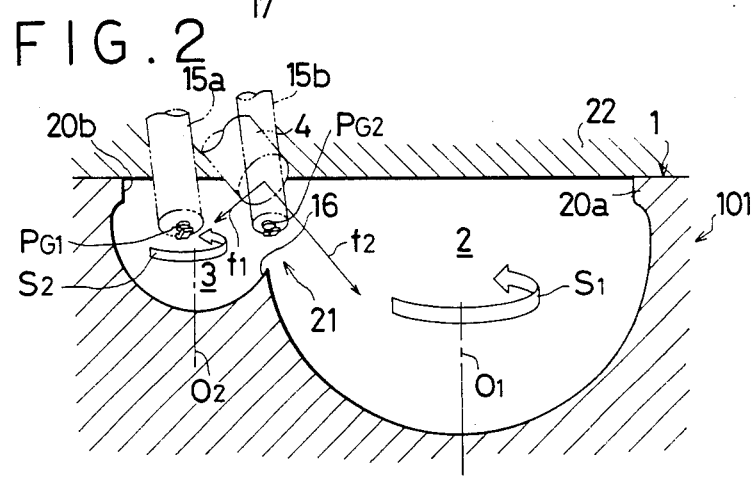
FIG. 2
FIG. 3
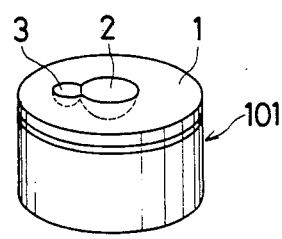
FIG. 4
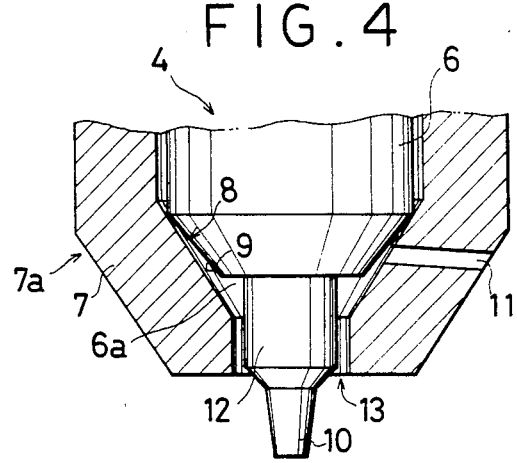

COMBUSTION CHAMBER FOR INTERNAL COMBUSTION ENGINE

BACKGROUND OF THE INVENTION

1. Field of the Invention

This invention relates to a combustion chamber for internal combustion engines, and more particularly to a combustion chamber suitable for an internal combustion engine operating on a fuel of a low cetane number such as gasoline, alcohol or the like.

2. Prior Art

Generally, in the case where a fuel oil is injection into a combustion chamber directly as in Diesel engines or the like, it is necessary to properly mix the fuel with air in order to improve the quality of combustion.

However, where the injected fuel oil is a volatile fuel oil of a low cetane number like alcohol or gasoline, the fuel volatilizes and disperses as soon as it is injected into the combustion chamber due to its high volatility, and thereby forms a lean air-fuel mixture therein. Therefore, problems arise in terms of ignition quality and flame propagation quality even if a forced ignition means like a spark plug is used. These problems become worse expectially under light load operation with a reduced amount of fuel injection. In this connection, it is possible to choke the intake air as a countermeasure, but this is however undesirable because of degradations in output and mileage qualities of the engine which result due to the additional pumping effort required of the engine to throttle the intake air.

In an attempt to eliminate these problems, the present inventors proposed in their co-pending Japanese patent application No. 60-106944 an improved combustion chamber for internal combustion engines.

As illustrated in FIG. 7 of the accompanying drawings, the just-mentioned prior application employs communicating main and subsidiary combustion chambers 2 and 3 which are formed side by side by hollowing a piston top 1, a fuel injection nozzle 4 disposed in the main and subsidiary combustion chambers 2 and 3 for injecting a fuel thereinto, and an ignition means 15a provided in the subsidiary combustion chamber 3 for igniting the injected fuel.

This arrangement attempts to enhance the combustion quality by confining a volatile fuel oil along with a swirl in the subsidiary combustion chamber of a smaller volume under light load operation to maintain an minimum air-fuel ratio for ignition by the ignition means, while under medium and high load operations propagating flame through a bank portion to the fuel oil which is injected and volatilized in the main combustion chamber.

However, the existence of the bank portion which restricts the entrance of the volatilized fuel oil into the main combustion chamber from the subsidiary combustion chamber has the effect of slightly delaying the velocity of flame propagation into the main combustion chamber under medium and high load operations, thereby lowering the output and mileage qualities to an extent corresponding to the delay. It is therefore necessary to solve these problems in order to attain combustion quality comparable to gasoline engines.

SUMMARY OF THE INVENTION

The present invention is intended to solve the abovementioned problems, and has as its object the provision of a combustion chamber for internal combustion engine employing communicating main and subsidiary combustion chambers which are formed in a piston top and having means for forcibly igniting volatilized fuel in the main combustion chamber prior to flame propagation from the subsidiary to main combustion chamber under medium and high load operations to ensure improved output and mileage.

In accordance with the present invention, there is provided a combustion chamber which comprises:

a main combustion chamber formed by hollowing the top of a piston in the axial direction thereof, and a subsidiary combustion chamber formed side by side with the main combustion chamber also by hollowing the top of the piston in the axial direction, with a passage formed through a common peripheral wall portion between the main and subsidiary combustion chambers and opened on the upper side to provide communication between the two chambers;

a fuel injection nozzle disposed in the communication passage to supply atomized fuel into the main and subsidiary combustion chambers at a piston position in the vicinity of the top dead center; and an ignition means having sparking portions received in the main and subsidiary combustion chambers at a piston piston in the vicinity of the top dead center to accelerate ignition of an atomized part of the supplied fuel.

In the operation of the combustion chamber in the abovedescribed construction, vortical flows of combustion air are supplied to the main and subsidiary combustion chambers to form swirls therein. Due to fluid inertia, these swirls do not interfere with each other. The fuel which is supplied in an atomized state from the fuel injection nozzle is volatilized and burned upon ignition by the ignition means in the subsidiary and main combustion chambers. The atomized fuel in the main combustion chamber is forcibly ignited by the ignition means prior to flame propagation from the subsidiary to main combustion chamber, thereby ensuring stabilized combustion quality and improving the output and mileage characteristics.

The above and other objects, features and advantages of the invention will become more apparent from the following description and the appended claims, taken in conjunction with the accompanying drawings which show by way of example preferred embodiments in the invention.

BRIEF DESCRIPTION OF THE DRAWINGS

In the accompanying drawings:

FIG. 1 is a schematic plan view of an embodiment of the invention;

FIG. 2 is a schematic longitudinal section, showing main and subsidiary combustion chambers according to the invention along with the direction of a fuel injection nozzle which supplies fuel to these chambers;

FIG. 3 is a schematic perspective view of the main and subsidiary combustion chambers formed into the top wall of a piston;

FIG. 4 is a schematic section, showing part of the fuel injection nozzle of FIG. 2 on an enlarged scale;

DESCRIPTION OF PREFERRED EMBODIMENTS

Figure 5:
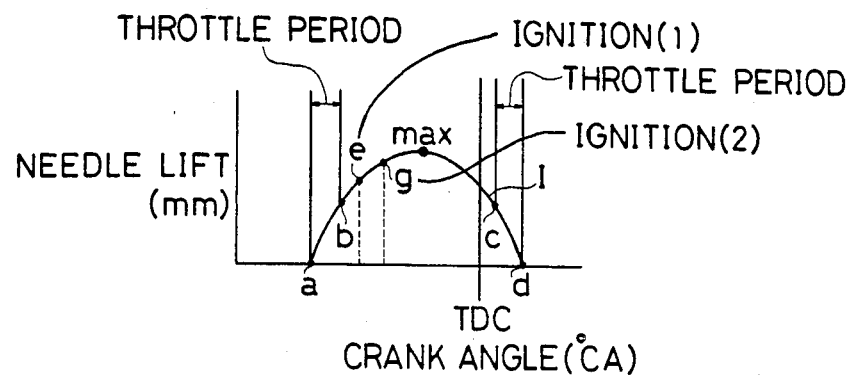
FIG. 5 is a spark timing chart of the ignition means.

Hereafter, a preferred embodiment of the internal combustion engine according to the invention is described with reference to the drawings.

In FIG. 3, indicated at 101 is a piston which is reciprocably received in a cylinder (not shown) of an internal combustion engine, including a piston top 1 which forms the top end of the piston, a main combustion chamber 2, and a subsidiary combustion chamber 3.

As shown also in FIGS. 1 and 2, the main combustion chamber 2 is formed on the piston top 1 of the piston 101 by hollowing the top surface 1 in a direction parallel with the axis thereof. The subsidiary combustion chamber 3 is also formed on the piston top 1 by hollowing the top surface in the axial direction, side by side and parallel with the main combustion chamber 2. In this particular embodiment, the main and subsidiary combustion chambers 2 and 3 are substantially in the form of truncated circles or semicircles when sectioned through the axis of the piston 101, and in the form of circles when sectioned across the axis of the piston 101.

The main and subsidiary combustion chambers 2 and 3 which are formed in the above-described manner are provided with lip portions 20a and 20b which extend radially inward from the marginal edge portions of the respective upper openings.

With regard to the depths of the hollowed cavities, the cavity for the subsidiary combustion chamber 3 is deeper than the cavity for the main combustion chamber 2. With regard to the opening diameters of the hallowed cavities, the subsidiary combustion chamber 3 has a smaller opening diameter than the main combustion chamber. It thus follows that the subsidiary combustion chamber 3 is formed to have a smaller volume than the main combustion chamber 2.

The subsidiary combustion chamber 3 overlaps the main combustion chamber as a result of the center axis $0_2$ of the subsidiary combustion chamber 3 which is in parallel relationship to the main combustion chamber 2 having been shifted toward the center axis $0_1$ of the latter. As a result of this overlapping relationship, a communication passage 21 having a passage area corresponding to the extent of overlap distance is formed between the main and subsidiary combustion chambers 2 and 3, and a bank portion 16 is formed immediately beneath the communication passage 21.

In this instance, the heights of the communication passage 21 and bank portion 16 vary directly with the distance over which the center axis $0_2$ of the subsidiary combustion chamber 3 is shifted radially toward the center axis $0_1$ of the main combustion chamber 2. The just-mentioned distance is determined appropriately in a manner such as to prevent interferences between the swirls which are generated in the main and subsidiary combustion chambers 2 and 3.

A feature of the internal combustion engine according to the present invention resides in that a volatile fuel oil of a low cetane number can be burned without ignition failures under operations of any load range including an engine-starting stage to obtain high output performance equivalent ot gasoline engines.

For this purpose, the shape of the combustion chamber, fuel injection nozzle and ignition means are arranged as follows. The fuel injection nozzle 4 is arranged in the manner as shown in FIG. 4. As shown in this figure, a nozzle casing 7 which slidably receives therein a needle valve 6 is provided with a valve seat 8 at its front end for engagement with a throttle portion 6a of the needle valve 6. Formed at the front end of the nozzle casing 7 is a main nozzle hole 13 which is opened and closed by the throttle portin 6a at the front end of the needle valve 6. An auxiliary nozzle hole 11 is opened through the valve seat 8.

The auxiliary nozzle hole 11 of the fuel injection nozzle 4 has a smaller diameter than the main nozzle hole 13. The fuel injection nozzle 4 first opens the auxiliary nozzle hole 11 in the valve seat 8 when the lift of the needle valve 6 is smaller than a predetermined value, and, as soon as the needle valve lift exceeds the predetermined value, opens the main nozzle hole 13 which has been closed by the throttle portion 6a. Thus, the fuel injection nozzle 4 employed in this particular embodiment is arranged in the fashion of the so-called pintaux type.

The fuel injection nozzle 4 of the above-described construction is located relative to the main and subsidiary combustion chambers 2 and 3 in the following manner. The fuel injection nozzle 4 is fixedly mounted such that, when the piston 101 is moved to a position in the vicinity of its upper dead center, its front end portin 7a is received in the cylinder head 22, facing the bank portion 16. At this time, the auxiliary nozzle hole 11 is opened toward the inner wall 3a which is located radially outward of the center axis $0_2$ of the subsidiary combustion chamber 3 and downstream of the swirls 52 in the subsidiary combustion chamber 3 based on the position of the intercommunicating passage 21. The main nozzle hole 13 is opened toward the inner wall 2a which is located radially outward of the center axis $0_1$ of the main combustion chamber 2 and downstream of the swirls S1 in the main combustion chamber 2 based on the position of the communication passage 21.

Spark plugs which serve as the ignition means are located in the following manner. The first spark plug 15a is fixedly fitted in the cylinder head 22 such that its sparking portion PG1 is received in the subsidiary combustion chamber 3 when the piston 101 is moved to a position in the vicinity of its upper dead center. At this time, the second spark plug 15b which is fixedly fitted also in the cylinder head 22 has its sparking portion PG2 received in the main combustion chamber 2 in the vicinity of the communication passage 21 and close to the inner wall 2a downstream of the swirl S1 in the main combustion chamber 2 based on the position of the communication passage 21.

In this particular embodiment, in order to locate the sparking portion PG2 of the second spark plug 15b as close as possible to the inner wall 2a, the latter is arcuately recessed radially outward to form a cavity 17 for receiving the sparking portion PG2 of the second spark plug 15b therein.

In operation, the vortical stream of combustion air which is supplied into the cylinder (not shown) through a swirl port (not shown) forms swirls S1 and S2 in the main and subsidiary combustion chambers 2 and 3, respectively.

During an engine-starting stage or under light load operation, the lift of the needle valve 6 of the fuel injection nozzle 4 shown in FIG. 4 is increased according to the amount of fuel oil supplied into the nozzle casing. To explain this, reference is now made to FIG. 5 which depicts a diagram of fuel injection characteristics against the crank angle, in which (I) is a fuel injection characteristic curve. As seen in this figure, depending on increases of the fuel oil supply, the valve ligt is increased, lifting up needle valve 6 away from its fully closed position a. In this instance, the fuel injection nozzle 4 is constructed so as not to open the main nozzle hole 13 until the lift of the needle valve 6 reaches a pre-determined value, so that the auxiliary nozzle hole 11 alone is opened up to a lift position b, supplying atomized fuel into the subsidiary combustion chamber 3 only. A spray of atomized fuel F1 which is supplied through the auxiliary nozzle hole 11 is further atomized and scattered by bombarding against the inner wall 3a of the subsidiary combustion chamber 3 as shown in FIG. 1. The dispersed part of the fuel is instantly volatilized by the heat of compressed air and wall heat in the subsidiary combustion chamber 3 and mixed with air.

The remainder of the finely atomized fuel which deposits and forms a thin fuel film H1 on the inner wall 3a of the subsidiary combustion chamber 3 is gradually volatilized by hot compressed air and wall heat and mixed with air.

Therefore, the fuel vapors in the subsidiary combustion chamber 3 are mixed with air to form an air-fuel mixture F1 with good ignition and combustion qualities, and this pre-mixed fuel F1 is entrained on the swirl S2.

While the pre-mixed fuel F1 is formed, namely, as a spark is produced by the second spark plug 15b at a crank angle e, the air-fuel mixture F1 is ignited and burned. The flame and energy resulting from the combustion accelerates volatilization of the fuel film H1 depositing on the inner wall 3a of the subsidiary combustion chamber 3 to effect optimum combustion.

Accordingly, in an engine-starting stage, the richness of the air-fuel mixture in the subsidiary combustion chamber 3 can be adjusted appropriately even when the fuel is a volatile fuel of a low cetane number. It is possible to adjust the ignition quality under cold starting conditions by adjusting the ratio of fuel to air to be supplied (i.e., air-fuel ratio).

In this manner, as a spray of atomized fuel F1 is supplied from the auxiliary nozzle hole 11, the most part of the fuel spray f1 is distributed along the inner wall 3a. Since the subsidiary combustion chamber 3 is partitioned from the main combustion chamber 2 by the bank portion 16, the volatilization and combustion of the fuel can be reliably effected.

Additionally, combustion gas which is produced in the subsidiary combustion chamber 3 is prevented from flowing into the main combustion chamber 2 by the swirl S1, thereby increasing the combustion temperature in the subsidiary chamber 3.

Consequently, production of bluish white smoke and combustible substances (Hc) can be suppressed to a considerable degree.

In the above-described operation, a small amount of the fuel which leaks through the clearance, which is provided around the needle valve 6 for its sliding operation as shown in FIG. 4, is sprayed into the main combustion chamber 2 through the main nozzle hole and burned by the flame propagating through the intercommunicating passage 21.

Under medium and high load operation of the engine, the needle valve 6 is lifted in excess of the predetermined lift value as shown in FIG. 5, opening also the main nozzle hole 13 after a throttle period.

Figure 6:
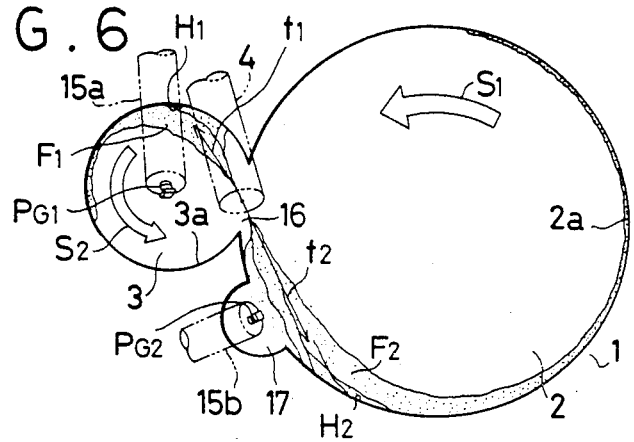
FIG. 6 is a schematic illustration showing the condition of combustion in medium and high load operations.
Figure 7:
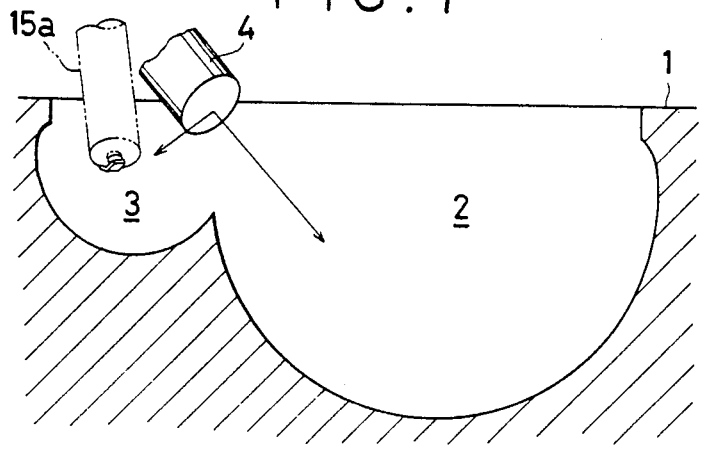
FIG. 7 is a schematic longitudinal section of a combustion chamber of an internal combustion engine which forms art which is related to the present invention.

As shown in FIG. 6, as soon as the main nozzle hole is opened, the fuel is supplied into the main combustion chamber 2 in an atomized state from the main nozzle hole 13. The spray f2 of the atomized fuel from the main nozzle hole 13 is spread with a large penetrating force, part of the spread fuel being volatilized by hot compressed air and wall heat and mixed with air. The remainder of the sprayed fuel forms a fuel film H2 and a pre-mixed fuel F2 along the inner wall of the main combustion chamber 2 in the same manner as in the subsidiary combustion chamber 3. Therefore, a spark should be produced when the pre-mixed fuel is distributed around the sparking portion PG2 of the second spark plug 15b.

With regard to the spark timing of the second spark plug 15b, it is adapted to produce a spark at a crank angle position g as shown in FIG. 5. Namely, a spark is produced before the flame propagation from the subsidiary combustion chamber 3, thereby to burn the fuel promptly and preventing drops in output quality.

As seen in FIG. 5, the amount of fuel which is injected under medium and high load conditions is increased in proportion to the lift of the needle valve 6, also increasing the penetrating force of the fuel spray f2. Accordingly, the air-fuel mixture which is formed in the main combustion chamber immediately after injection cannot be excessive. Consequently, slow combustion occurs by gradual evaporation of the fuel film H2, without the possibility of abnormal increases in the combustion pressure in the main combustion chamber 2. Therefore, noise and smoke can be suppressed.

As the load is increased, the amount of fuel which is supplied in an atomized state from the main nozzle hole 13 is increased, injecting more than 90% at maximum at the maximum lift before the top dead center as shown in FIG. 5. Therefore, the above-described operation is highly reliable, and the fuel which is supplied to the main combustion chamber 2 in an atomized state is ignited by the flame coming in from the subsidiary combustion chamber 3. As the needle valve 6 passes the top dead center positin (TDC), the main nozzle hole 13 is closed, and the auxiliary nozzle hole 11 is closed after a throttle period (C-D), fully closing the nozzle.

What is claimed is:

1. A combustion chamber for an internal combustion engine, comprising:
   a main combustion chamber hollowed out of the top of a piston;
   a subsidiary combustion chamber hollowed out of said piston top, said subsidiary combustion chamber communicating with and disposed in side by side relatinship to said main combustion chamber;
   a fuel injection nozzle located generally between said main and subsidiary combustion chambers, and having a main nozzle hole for supplying a spray of atomized fuel to said main combustion chamber and an auxiliary nozzle hole adapted to be opened before said main nozzle hole for supplying a spray of atomized fuel to said subsidiary combustion chamber; and
   sparking means located in both main and subsidiary combustion chambers to accelerate ignition of the supplied fuel.

2. The combustion chamber for an internal combustion engine as set forth in claim 1, wherein said subsidiary combustion chamber is shallower and has a smaller volume than said main combustion chamber.

3. The combustion chamber for an internal combustion engine as set forth in claim 1, wherein said main and subsidiary combustion chambers are each open on the upper side thereof and are each provided with a lip portion extending radially inward adjacent said upper side.

4. The combustion chamber for an internal combustion engine as set forth in claim 1, including in said piston top a passage having an open upper side and formed through the peripheral walls of said main and subsidiary combustion chambers, said passage placing said main and subsidiary combustion chambers in communication with each other and defining thereunder a bank portion of a predetermined height from the bottom of said subsidiary combustion chamber.

5. The combustion chamber for an internal combustion engine as set forth in claim 1, wherein said fuel injection nozzle means includes a nozzle body and a needle valve liftably fitted in the nozzle body and adapted to open said auxiliary nozzle hole at a value less than a predetermined value and to open said main nozzle hole at a valve lift greater than said predetermined value.

6. The combustion chamber for an internal combustion engine as set forth in claim 5, wherein said main and auxiliary nozzle holes of said fuel injection nozzle means face toward the inner walls of said main and subsidiary combustion chambers and in the direction of fuel swirls created therein.

7. The combustion chamber for an internal combustion engine as set forth in claim 5, wherein said auxiliary nozzle hole of said fuel injection means has a diameter substantially smaller than that of said main nozzle hole.

8. The combustion chamber for an internal combustion engine as set forth in claim 7, wherein said ignition means is located in said main and subsidiary combustion chambers in positions downstream of the fuel sprayed from said fuel injection nozzle means.

9. The combustion chamber for an internal comustion engine as set forth in claim 6, wherein said auxiliary nozzle hole of said fuel injection means has a diameter substantially smaller than that of said main nozzle hole.

10. The combustion chamber for an internal combustion engine as set forth in claim 1 wherein said auxiliary nozzle hole of said fuel injection means has a diameter substantially smaller than that of said main nozzle hole.

11. The combustion chamber for an internal combustion engine as set forth in claim 1, wherein said main and auxiliary nozzle holes of said fuel injection nozzle means face toward the inner walls of said main and subsidiary combustion chambers and in the directions of fuel swirls created therein.

12. A combustion chamber for an internal combustion engine, comprising:
   a main combustion chamber defined in the top of a piston;
   a subsidiary combustion chamber defined in said piston top and adjacent said main combustion chamber, said main and subsidiary chambers communicating with each other through a passage in said piston top;
   fuel injection nozzle means located generally in said passage for supplying a spray of fuel to said chambers; and
   sparking means located in said main and subsidiary combustion chambers for accelerating ignition of the supplied fuel.

13. The combustion chamber for an internal combustion engine as set forth in claim 12, wherein said sparking means is located in said main and subsidiary combustion chambers at positions downstream of a spray of fuel supplied by said fuel injection nozzle means.

* * * * *

UNITED STATES PATENT AND TRADEMARK OFFICE
CERTIFICATE OF CORRECTION

PATENT NO. : 4,784,097
DATED : November 15, 1988
INVENTOR(S) : Shiro Ishida

It is certified that error appears in the above-identified patent and that said Letters Patent is hereby corrected as shown below:

Column 8, line 1, change "comustion" to --combustion--.

Signed and Sealed this

Twenty-first Day of March, 1989

*Attest:*

DONALD J. QUIGG

*Attesting Officer*    *Commissioner of Patents and Trademarks*